United States Patent
Mills et al.

(10) Patent No.: US 11,853,868 B2
(45) Date of Patent: Dec. 26, 2023

(54) MULTI DIMENSIONAL CONVOLUTION IN NEURAL NETWORK PROCESSOR

(71) Applicant: Apple Inc., Cupertino, CA (US)

(72) Inventors: Christopher L. Mills, Saratoga, CA (US); Sung Hee Park, San Jose, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 17/944,889

(22) Filed: Sep. 14, 2022

(65) Prior Publication Data
US 2023/0018248 A1     Jan. 19, 2023

Related U.S. Application Data

(63) Continuation of application No. 16/662,789, filed on Oct. 24, 2019, now Pat. No. 11,475,283.

(51) Int. Cl.
*G06N 3/063* (2023.01)
*G06F 7/544* (2006.01)
*G06F 17/15* (2006.01)

(52) U.S. Cl.
CPC ........... *G06N 3/063* (2013.01); *G06F 7/5443* (2013.01); *G06F 17/15* (2013.01)

(58) Field of Classification Search
None
See application file for complete search history.

(56) References Cited

U.S. PATENT DOCUMENTS

| | | | |
|---|---|---|---|
| 9,451,142 B2* | 9/2016 | McGarry | G06V 10/955 |
| 10,242,311 B2 | 3/2019 | Lo | |
| 11,693,625 B2* | 7/2023 | Ware | G06F 7/5235 |
| | | | 708/517 |

(Continued)

FOREIGN PATENT DOCUMENTS

EP     3330899 A1     6/2018

OTHER PUBLICATIONS

Fan, H. et al., "F-E3D: FPGA-based Acceleration of an Efficient 3D Convolutional Neural Network for Human Action Recognition," 2019 IEEE 30$^{th}$ International Conference on Application-Specific Systems, Architectures and Processors (ASAP), Jul. 2019, pp. 1-8.

(Continued)

*Primary Examiner* — Eric Coleman
(74) *Attorney, Agent, or Firm* — Sterne, Kessler, Goldstein & Fox P.L.L.C.

(57) ABSTRACT

Embodiments of the present disclosure relate to a neural engine of a neural processor circuit having multiple multiply-add circuits and an accumulator circuit coupled to the multiply-add circuits. The multiply-add circuits perform multiply-add operations of a three dimensional convolution on a work unit of input data using a kernel to generate at least a portion of output data in a processing cycle. The accumulator circuit includes multiple batches of accumulators. Each batch of accumulators receives and stores, after the processing cycle, the portion of the output data for each output depth plane of multiple output depth planes. A corresponding batch of accumulators stores, after the processing cycle, the portion of the output data for a subset of the output channels and for each output depth plane.

20 Claims, 8 Drawing Sheets

PERFORM, USING MULTIPLY-ADD CIRCUITS, MULTIPLY-ADD OPERATIONS OF THREE DIMENSIONAL CONVOLUTION ON WORK UNIT OF INPUT DATA USING KERNEL TO GENERATE AT LEAST PORTION OF OUTPUT DATA IN PROCESSING CYCLE
702

STORE, IN EACH OF MULTIPLE BATCHES OF ACCUMULATORS OF ACCUMULATOR CIRCUIT COUPLED TO MULTIPLY-ADD CIRCUITS, PORTION OF OUTPUT DATA FOR EACH OUTPUT DEPTH PLANE
704

(56) References Cited

U.S. PATENT DOCUMENTS

| | | | | |
|---|---|---|---|---|
| 2017/0116495 | A1* | 4/2017 | Nomura | G06N 3/08 |
| 2018/0005075 | A1 | 1/2018 | Shacham et al. | |
| 2018/0046900 | A1* | 2/2018 | Dally | G06N 3/082 |
| 2018/0096226 | A1 | 4/2018 | Aliabadi et al. | |
| 2018/0189642 | A1* | 7/2018 | Boesch | G06F 30/327 |
| 2018/0285727 | A1 | 10/2018 | Baum et al. | |
| 2018/0300616 | A1* | 10/2018 | Ambardekar | G06N 3/04 |
| 2018/0315154 | A1* | 11/2018 | Park | G06F 17/153 |
| 2018/0350463 | A1* | 12/2018 | Zielinski | G06Q 40/08 |
| 2018/0373981 | A1 | 12/2018 | Hu et al. | |
| 2019/0079764 | A1* | 3/2019 | Diamond | G06N 3/063 |
| 2019/0180167 | A1 | 6/2019 | Huang et al. | |
| 2019/0213482 | A1 | 7/2019 | Socher et al. | |

OTHER PUBLICATIONS

Liu, Y. et al., "Optimizing CNN Model Inference on CPUs," 2019 USENIX Annual Technical Conference, Jul. 2019, pp. 1025-1039.

Park, J. et al., "Deep learning Inference in Facebook Data Centers: Characterization, Performance Optimizations and Hardware Implications," arXiv:1811.09886, Nov. 29, 2018, pp. 1-12.

PCT International Search Report and Written Opinion, PCT Application No. PCT/US2020/052053, dated Dec. 22, 2020, 15 pages.

Peemen, M. C. J., "Improving the efficiency of deep convolutional networks," Eindhoven: Technische Universiteit Eindhoven, Dec. 10, 2017, pp. 1-160.

Zlateski, A. et al., "ZNNi—Maximizing the Inference Throughput of 3S Convolutional Networks on Multi-Core CPUs and GPUs," arXiv: 1606.05688, Jun. 17, 2016, pp. 1-12.

United States Office Action, U.S. Appl. No. 16/662,789, dated Jun. 21, 2022, 11 pages.

\* cited by examiner

MULTI DIMENSIONAL CONVOLUTION IN NEURAL NETWORK PROCESSOR

CROSS-REFERENCE TO RELATED APPLICATIONS

This application is a continuation of U.S. application Ser. No. 16/662,789, filed Oct. 24, 2019, which is hereby incorporated by reference in its entirety.

BACKGROUND

1. Field of the Disclosure

The present disclosure relates to a circuit for performing operations related to neural networks, and more specifically to a neural engine circuit of a neural network processor that performs multi dimensional convolution operations.

2. Description of the Related Arts

An artificial neural network (ANN) is a computing system or model that uses a collection of connected nodes to process input data. The ANN is typically organized into layers where different layers perform different types of transformation on their input. Extensions or variants of ANN such as convolution neural network (CNN), recurrent neural networks (RNN) and deep belief networks (DBN) have come to receive much attention. These computing systems or models often involve extensive computing operations including multiplication and accumulation. For example, CNN is a class of machine learning technique that primarily uses convolution between input data and kernel data, which can be decomposed into multiplication and accumulation operations.

Depending on the types of input data and operations to be performed, these machine learning systems or models can be configured differently. Such varying configuration would include, for example, pre-processing operations, the number of channels in input data, kernel data to be used, non-linear function to be applied to convolution result, and applying of various post-processing operations. Using a central processing unit (CPU) and its main memory to instantiate and execute machine learning systems or models of various configuration is relatively easy because such systems or models can be instantiated with mere updates to code. However, relying solely on the CPU for various operations of these machine learning systems or models would consume significant bandwidth of a central processing unit (CPU) as well as increase the overall power consumption.

SUMMARY

Embodiments relate to a neural engine circuit of a neural processor circuit that perform operations of a three dimensional (3D) convolution on input data. The neural engine circuit includes multiple multiply-add circuits and an accumulator circuit with multiple accumulators coupled to outputs of the multiply-add circuits. The multiply-add circuits perform multiply-add operations of the 3D convolution on a work unit of input data using a kernel to generate at least a portion of output data in a processing cycle of the neural engine circuit. The accumulator circuit is divided into multiple batches of accumulators. Each batch of accumulators receives and stores, after the processing cycle, the portion of output data for each output depth plane of multiple output depth planes and for a corresponding output channel of multiple output channels. Each output depth plane of the output data includes the portion of output data for an output channel having an output width and an output height.

Figure 1:
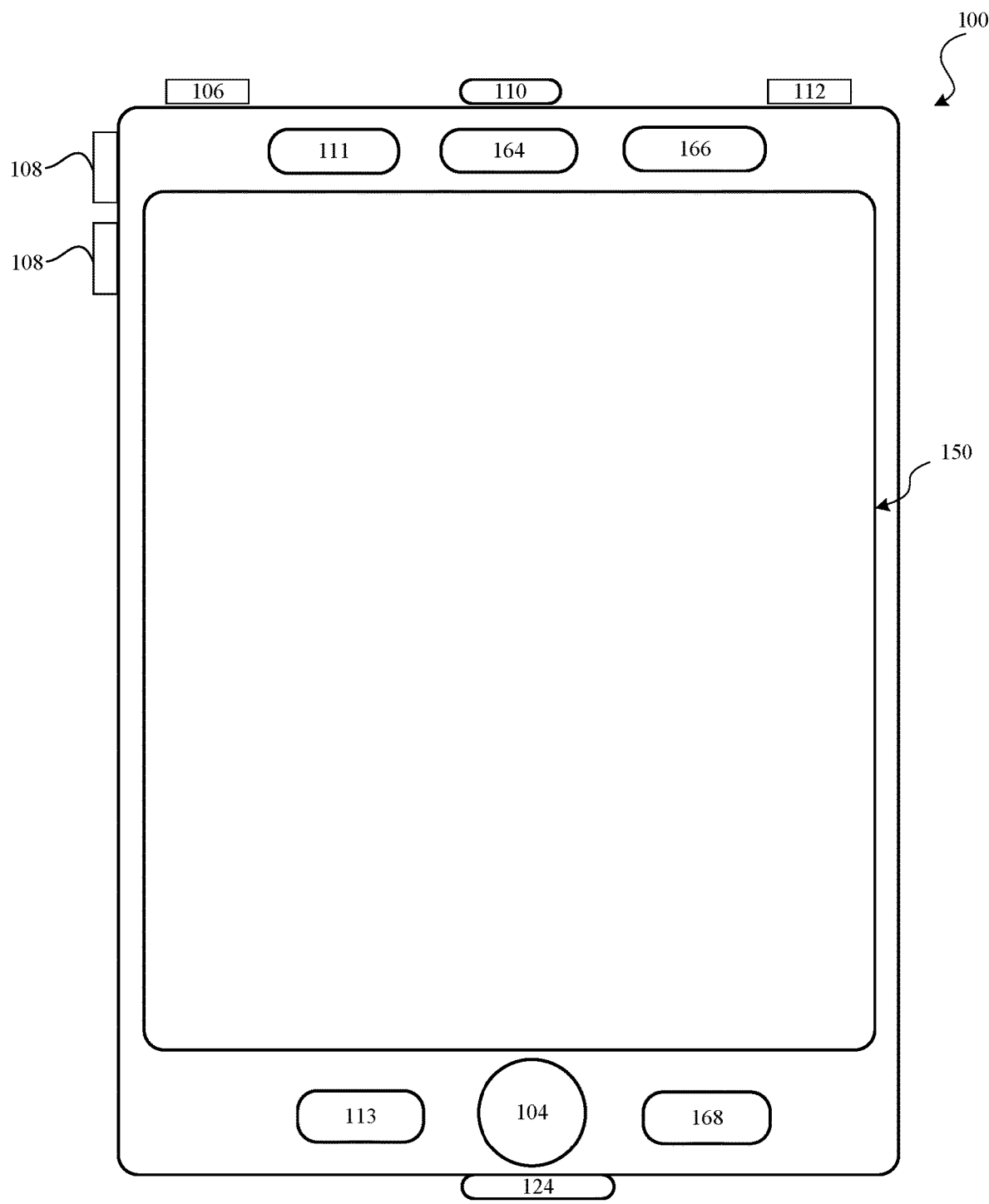
FIG. 1 is a high-level diagram of an electronic device, according to one embodiment.

The figures depict, and the detail description describes, various non-limiting embodiments for purposes of illustration only.

DETAILED DESCRIPTION

Reference will now be made in detail to embodiments, examples of which are illustrated in the accompanying drawings. In the following detailed description, numerous specific details are set forth in order to provide a thorough understanding of the various described embodiments. However, the described embodiments may be practiced without these specific details. In other instances, well-known methods, procedures, components, circuits, and networks have not been described in detail so as not to unnecessarily obscure aspects of the embodiments.

Embodiments of the present disclosure relate to a neural engine circuit of a neural processor circuit configured to perform operations of a three dimensional (3D) convolution on input data. The neural engine circuit includes multiple multiply-add circuits coupled to multiple accumulators. During a processing cycle of the neural engine circuit, the multiply-add circuits perform operations of the 3D convolution on a work unit of input data and kernel data to generate a portion of output data having the 3D spatial support for each output channel. The accumulators that store the output data during the 3D convolution are divided into multiple batches of accumulators. Each batch of accumulators receives and stores, at the end of processing cycle, portions of output data for a corresponding depth plane and for at least a subset of output channels.

The 3D convolution described herein is convolution performed on three dimensional input data. The 3D convolution is an extension of the 2D convolution with one additional dimension (e.g., depth dimension). The 3D convolution of input data involves 3D spatial support (e.g., width, height and depth dimensions) for each input channel and kernel data having 3D spatial support. The 3D convolution can be used in processing of volumetric data (e.g., input data having a width dimension, height dimension and depth dimension) or temporal video data (e.g., input data having a width dimension, height dimension and time dimension).

Exemplary Electronic Device

Embodiments of electronic devices, user interfaces for such devices, and associated processes for using such devices are described. In some embodiments, the device is a portable communications device, such as a mobile telephone, that also contains other functions, such as personal digital assistant (PDA) and/or music player functions. Exemplary embodiments of portable multifunction devices include, without limitation, the iPhone®, iPod Touch®, Apple Watch®, and iPad® devices from Apple Inc. of Cupertino, California. Other portable electronic devices, such as wearables, laptops or tablet computers, are optionally used. In some embodiments, the device is not a portable communication device, but is a desktop computer or other computing device that is not designed for portable use. In some embodiments, the disclosed electronic device may include a touch-sensitive surface (e.g., a touch screen display and/or a touchpad). An example electronic device described below in conjunction with FIG. 1 (e.g., device 100) may include a touch-sensitive surface for receiving user input. The electronic device may also include one or more other physical user-interface devices, such as a physical keyboard, a mouse and/or a joystick.

FIG. 1 is a high-level diagram of an electronic device 100, according to one embodiment. Device 100 may include one or more physical buttons, such as a "home" or menu button 104. Menu button 104 is, for example, used to navigate to any application in a set of applications that are executed on device 100. In some embodiments, menu button 104 includes a fingerprint sensor that identifies a fingerprint on menu button 104. The fingerprint sensor may be used to determine whether a finger on menu button 104 has a fingerprint that matches a fingerprint stored for unlocking device 100. Alternatively, in some embodiments, menu button 104 is implemented as a soft key in a graphical user interface (GUI) displayed on a touch screen.

In some embodiments, device 100 includes touch screen 150, menu button 104, push button 106 for powering the device on/off and locking the device, volume adjustment buttons 108, Subscriber Identity Module (SIM) card slot 110, headset jack 112, and docking/charging external port 124. Push button 106 may be used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 includes various components including, but not limited to, a memory (which may include one or more computer readable storage mediums), a memory controller, one or more central processing units (CPUs), a peripherals interface, an RF circuitry, an audio circuitry, speaker 111, microphone 113, input/output (I/O) subsystem, and other input or control devices. Device 100 may include one or more image sensors 164, one or more proximity sensors 166, and one or more accelerometers 168. Device 100 may include more than one type of image sensors 164. Each type may include more than one image sensor 164. For example, one type of image sensors 164 may be cameras and another type of image sensors 164 may be infrared sensors for facial recognition that is performed by one or more machine learning models stored in device 100. Device 100 may include components not shown in FIG. 1 such as an ambient light sensor, a dot projector and a flood illuminator that is to support facial recognition.

Device 100 is only one example of an electronic device, and device 100 may have more or fewer components than listed above, some of which may be combined into a component or have a different configuration or arrangement. The various components of device 100 listed above are embodied in hardware, software, firmware or a combination thereof, including one or more signal processing and/or application-specific integrated circuits (ASICs).

Figure 2:
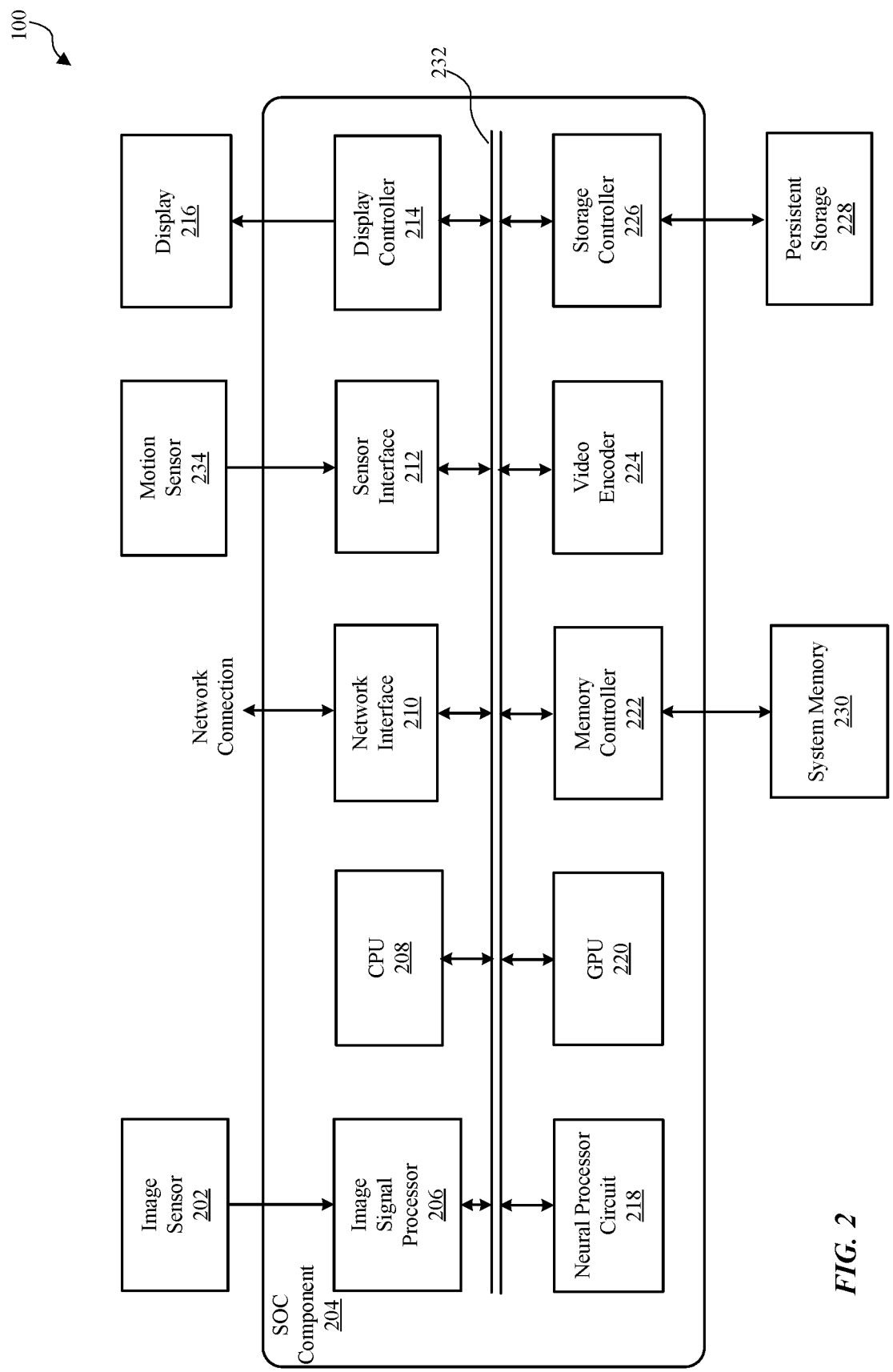
FIG. 2 is a block diagram illustrating components in the electronic device, according to one embodiment.

FIG. 2 is a block diagram illustrating components in device 100, according to one embodiment. Device 100 may perform various operations including implementing one or more machine learning models. For this and other purposes, device 100 may include, among other components, image sensors 202, a system-on-a chip (SOC) component 204, a system memory 230, a persistent storage (e.g., flash memory) 228, a motion sensor 234, and a display 216. The components as illustrated in FIG. 2 are merely illustrative. For example, device 100 may include other components (such as speaker or microphone) that are not illustrated in FIG. 2. Further, some components (such as motion sensor 234) may be omitted from device 100.

An image sensor 202 is a component for capturing image data and may be embodied, for example, as a complementary metal-oxide-semiconductor (CMOS) active-pixel sensor) a camera, video camera, or other devices. Image sensor 202 generates raw image data that is sent to SOC component 204 for further processing. In some embodiments, the image data processed by SOC component 204 is displayed on display 216, stored in system memory 230, persistent storage 228 or sent to a remote computing device via network connection. The raw image data generated by image sensor 202 may be in a Bayer color kernel array (CFA) pattern.

Motion sensor 234 is a component or a set of components for sensing motion of device 100. Motion sensor 234 may generate sensor signals indicative of orientation and/or acceleration of device 100. The sensor signals are sent to SOC component 204 for various operations such as turning on device 100 or rotating images displayed on display 216.

Display 216 is a component for displaying images as generated by SOC component 204. Display 216 may include, for example, liquid crystal display (LCD) device or an organic light-emitting diode (OLED) device. Based on data received from SOC component 204, display 216 may display various images, such as menus, selected operating parameters, images captured by image sensor 202 and processed by SOC component 204, and/or other information received from a user interface of device 100 (not shown).

System memory 230 is a component for storing instructions for execution by SOC component 204 and for storing data processed by SOC component 204. System memory 230 may be embodied as any type of memory including, for example, dynamic random access memory (DRAM), synchronous DRAM (SDRAM), double data rate (DDR, DDR2, DDR3, etc.) RAMBUS DRAM (RDRAM), static RAM (SRAM) or a combination thereof.

Persistent storage 228 is a component for storing data in a non-volatile manner. Persistent storage 228 retains data even when power is not available. Persistent storage 228 may be embodied as read-only memory (ROM), flash memory or other non-volatile random access memory devices. Persistent storage 228 stores an operating system of device 100 and various software applications. Persistent storage 228 may also store one or more machine learning models, such as regression models, random forest models, support vector machines (SVMs) such as kernel SVMs, and artificial neural networks (ANNs) such as convolutional network networks (CNNs), recurrent network networks (RNNs), autoencoders, and long short term memory (LSTM). A machine learning model may be an independent model that works with the neural processor circuit 218 and various software applications or sensors of device 100. A machine learning model may also be part of a software application. The machine learning models may perform various tasks such as facial recognition, image classification, object, concept, and information classification, speech recognition, machine translation, voice recognition, voice command recognition, text recognition, text and context analysis, other natural language processing, predictions, and recommendations.

Various machine learning models stored in device 100 may be fully trained, untrained, or partially trained to allow device 100 to reinforce or continue to train the machine learning models as device 100 is used. Operations of the machine learning models include various computation used in training the models and determining results in runtime using the models. For example, in one case, device 100 captures facial images of the user and uses the images to continue to improve a machine learning model that is used to lock or unlock the device 100.

SOC component 204 is embodied as one or more integrated circuit (IC) chip and performs various data processing processes. SOC component 204 may include, among other subcomponents, image signal processor (ISP) 206, a central processor unit (CPU) 208, a network interface 210, sensor interface 212, display controller 214, neural processor circuit 218, graphics processor (GPU) 220, memory controller 222, video encoder 224, storage controller 226, and bus 232 connecting these subcomponents. SOC component 204 may include more or fewer subcomponents than those shown in FIG. 2.

ISP 206 is a circuit that performs various stages of an image processing pipeline. In some embodiments, ISP 206 may receive raw image data from image sensor 202, and process the raw image data into a form that is usable by other subcomponents of SOC component 204 or components of device 100. ISP 206 may perform various image-manipulation operations such as image translation operations, horizontal and vertical scaling, color space conversion and/or image stabilization transformations.

CPU 208 may be embodied using any suitable instruction set architecture, and may be configured to execute instructions defined in that instruction set architecture. CPU 208 may be general-purpose or embedded processors using any of a variety of instruction set architectures (ISAs), such as the x86, PowerPC, SPARC, RISC, ARM or MIPS ISAs, or any other suitable ISA. Although a single CPU is illustrated in FIG. 2, SOC component 204 may include multiple CPUs. In multiprocessor systems, each of the CPUs may commonly, but not necessarily, implement the same ISA.

Graphics processing unit (GPU) 220 is graphics processing circuitry for performing graphical data. For example, GPU 220 may render objects to be displayed into a frame buffer (e.g., one that includes pixel data for an entire frame). GPU 220 may include one or more graphics processors that may execute graphics software to perform a part or all of the graphics operation, or hardware acceleration of certain graphics operations.

Neural processor circuit 218 is a circuit that performs various machine learning operations based on computation including multiplication, addition, and accumulation. Such computation may be arranged to perform, for example, various types of tensor multiplications such as tensor product and convolution of input data and kernel data. Neural processor circuit 218 is a configurable circuit that performs these operations in a fast and power-efficient manner while relieving CPU 208 of resource-intensive operations associated with neural network operations. Neural processor circuit 218 may receive the input data from sensor interface 212, the image signal processor 206, persistent storage 228, system memory 230 or other sources such as network interface 210 or GPU 220. The output of neural processor circuit 218 may be provided to various components of device 100 such as image signal processor 206, system memory 230 or CPU 208 for various operations. The structure and operation of neural processor circuit 218 are described below in detail with reference to FIG. 3.

Network interface 210 is a subcomponent that enables data to be exchanged between devices 100 and other devices via one or more networks (e.g., carrier or agent devices). For example, video or other image data may be received from other devices via network interface 210 and be stored in system memory 230 for subsequent processing (e.g., via a back-end interface to image signal processor 206) and display. The networks may include, but are not limited to, Local Area Networks (LANs) (e.g., an Ethernet or corporate network) and Wide Area Networks (WANs). The image data received via network interface 210 may undergo image processing processes by ISP 206.

Sensor interface 212 is circuitry for interfacing with motion sensor 234. Sensor interface 212 receives sensor information from motion sensor 234 and processes the sensor information to determine the orientation or movement of device 100.

Display controller 214 is circuitry for sending image data to be displayed on display 216. Display controller 214 receives the image data from ISP 206, CPU 208, graphic processor or system memory 230 and processes the image data into a format suitable for display on display 216.

Memory controller 222 is circuitry for communicating with system memory 230. Memory controller 222 may read data from system memory 230 for processing by ISP 206, CPU 208, GPU 220 or other subcomponents of SOC component 204. Memory controller 222 may also write data to system memory 230 received from various subcomponents of SOC component 204.

Video encoder 224 is hardware, software, firmware or a combination thereof for encoding video data into a format suitable for storing in persistent storage 228 or for passing the data to network interface 210 for transmission over a network to another device.

In some embodiments, one or more subcomponents of SOC component 204 or some functionality of these subcomponents may be performed by software components executed on neural processor circuit 218, ISP 206, CPU 208 or GPU 220. Such software components may be stored in system memory 230, persistent storage 228 or another device communicating with device 100 via network interface 210.

Example Neural Processor Circuit

Neural processor circuit 218 is a programmable circuit that performs machine learning operations on the input data of neural processor circuit 218. Machine learning operations may include different computations for training of a machine learning model and for performing inference or prediction based on the trained machine learning model.

Taking an example of a CNN as the machine learning model, training of the CNN may include forward propagation and backpropagation. A neural network may include an input layer, an output layer, and one or more intermediate layers that may be referred to as hidden layers. Each layer may include one or more nodes, which may be fully or partially connected to other nodes in adjacent layers. In forward propagation, the neural network performs computation in the forward direction based on outputs of a preceding layer. The operation of a node may be defined by one or more functions. The functions that define the operation of a node may include various computation operation such as convolution of data with one or more kernels, pooling of layers, tensor multiplication, etc. The functions may also include an activation function that adjusts the weight of the output of the node. Nodes in different layers may be associated with different functions. For example, a CNN may include one or more convolutional layers that are mixed with pooling layers and are followed by one or more fully connected layers.

Each of the functions, including kernels, in a machine learning model may be associated with different coefficients that are adjustable during training. In addition, some of the nodes in a neural network each may also be associated with an activation function that decides the weight of the output of the node in a forward propagation. Common activation functions may include step functions, linear functions, sigmoid functions, hyperbolic tangent functions (tanh), and rectified linear unit functions (ReLU). After a batch of data of training samples passes through a neural network in the forward propagation, the results may be compared to the training labels of the training samples to compute the network's loss function, which represents the performance of the network. In turn, the neural network performs backpropagation by using coordinate descent such as stochastic coordinate descent (SGD) to adjust the coefficients in various functions to improve the value of the loss function.

In training, device 100 may use neural processor circuit 218 to perform all or some of the operations in the forward propagation and backpropagation. Multiple rounds of forward propagation and backpropagation may be performed by neural processor circuit 218, solely or in coordination with other processors such as CPU 208, GPU 220, and ISP 206. Training may be completed when the loss function no longer improves (e.g., the machine learning model has converged) or after a predetermined number of rounds for a particular set of training samples. As device 100 is used, device 100 may continue to collect additional training samples for the neural network.

For prediction or inference, device 100 may receive one or more input samples. Neural processor circuit 218 may take the input samples to perform forward propagation to determine one or more results. The input samples may be images, speeches, text files, sensor data, or other data.

Data and functions (e.g., input data, kernels, functions, layers outputs, gradient data) in machine learning may be saved and represented by one or more tensors. Common operations related to training and runtime of a machine learning model may include tensor product, tensor transpose, tensor elementwise operation, convolution, application of an activation function, automatic differentiation to determine gradient, statistics and aggregation of values in tensors (e.g., average, variance, standard deviation), tensor rank and size manipulation, etc.

While the training and runtime of a neural network is discussed as an example, the neural processor circuit 218 may also be used for the operations of other types of machine learning models, such as a kernel SVM.

Figure 3:
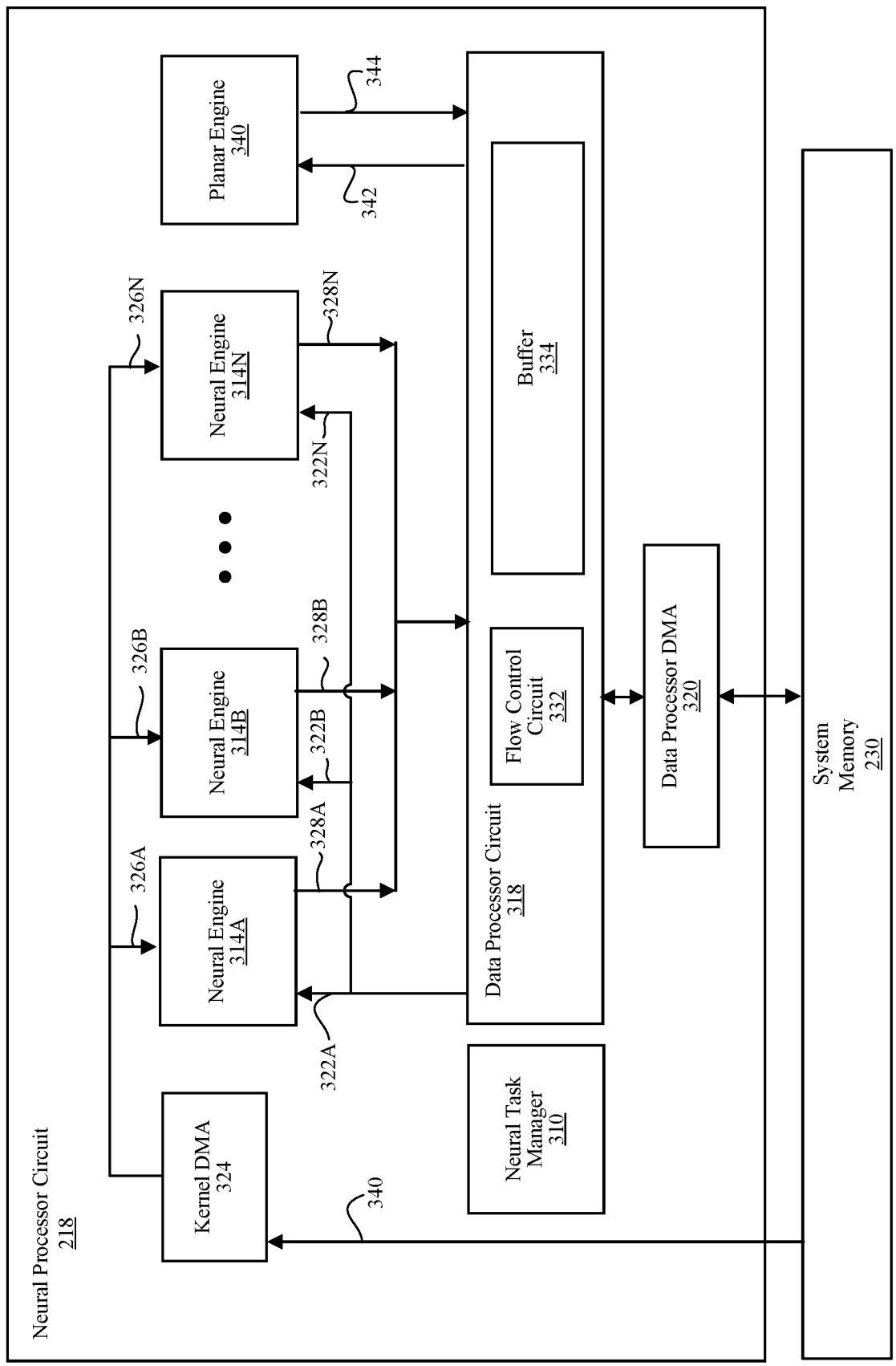
FIG. 3 is a block diagram illustrating a neural processor circuit, according to one embodiment.

Referring to FIG. 3, an example neural processor circuit 218 may include, among other components, neural task manager 310, a plurality of neural engines 314A through 314N (hereinafter collectively referred as "neural engines 314" and individually also referred to as "neural engine 314"), kernel direct memory access (DMA) 324, data processor circuit 318, data processor DMA 320, and planar engine 340. Neural processor circuit 218 may include fewer or additional components not illustrated in FIG. 3.

Each of neural engines 314 performs computing operations for machine learning in parallel. Depending on the load of operation, the entire set of neural engines 314 may be operating or only a subset of the neural engines 314 may be operating while the remaining neural engines 314 are placed in a power-saving mode to conserve power. Each of neural engines 314 includes components for storing one or more kernels, for performing multiply-accumulate operations, and for post-processing to generate an output data 328, as described below in detail with reference to FIG. 4. Neural engines 314 may specialize in performing computation heavy operations such as convolution operations and tensor product operations. Convolution operations may include different kinds of convolutions, such as cross-channel convolutions (a convolution that accumulates values from different channels), channel-wise convolutions, and transposed convolutions.

Planar engine 340 may specialize in performing simpler computing operations whose speed may primarily depend on the input and output (I/O) speed of the data transmission instead of the computation speed within planar engine 340. Those computing operations may be referred to as I/O bound computations. In contrast, neural engines 314 may focus on complex computation whose speed may primarily depend on the computation speed within each neural engine 314. For example, planar engine 340 is efficient at performing operations within a single channel while neural engines 314 are efficient at performing operations across multiple channels that may involve heavy accumulation of data. The use of neural engine 314 to compute I/O bound computations may not be efficient in terms of both speed and power consumption. In one embodiment, input data may be a tensor whose rank is larger than three (e.g., having three or more dimensions). A set of dimensions (two or more) in the tensor may be referred to as a plane while another dimension may be referred to as a channel. Neural engines 314 may convolve data of a plane in the tensor with a kernel and accumulate results of the convolution of different planes across different channels. On the other hand, planar engine 340 may specialize in operations within the plane.

The circuitry of planar engine 340 may be programmed for operation in one of multiple modes, including a pooling mode, an elementwise mode, and a reduction mode. In the pooling mode, planar engine 340 reduce a spatial size of input data. In the elementwise mode, planar engine 340 generates an output that is derived from elementwise operations of one or more inputs. In the reduction mode, planar engine 340 reduces the rank of a tensor. For example, a rank 5 tensor may be reduced to a rank 2 tensor, or a rank 3 tensor may be reduced to a rank 0 tensor (e.g., a scalar). The operations of planar engine 340 will be discussed in further detail below with reference to FIG. 5.

Neural task manager 310 manages the overall operation of neural processor circuit 218. Neural task manager 310 may receive a task list from a compiler executed by CPU 208, store tasks in its task queues, choose a task to perform, and send task commands to other components of the neural processor circuit 218 for performing the chosen task. Data may be associated with a task command that indicates the types of operations to be performed on the data. Data of the neural processor circuit 218 includes input data that is transmitted from another source such as system memory 230, and data generated by the neural processor circuit 218 in a previous operation cycle. Each dataset may be associated with a task command that specifies the type of operations to be performed on the data. Neural task manager 310 may also perform switching of tasks on detection of events such as receiving instructions from CPU 208. In one or more embodiments, neural task manager 310 sends rasterizer information to the components of neural processor circuit 218 to enable each of the components to track, retrieve or process appropriate segments of the input data and kernel data. For example, neural task manager 310 may include registers that stores the information regarding the size and rank of a dataset for processing by the neural processor circuit 218. Although neural task manager 310 is illustrated in FIG. 3 as part of neural processor circuit 218, neural task manager 310 may be a component outside the neural processor circuit 218.

Kernel DMA 324 is a read circuit that fetches kernel data from a source (e.g., system memory 230) and sends kernel data 326A through 326N to each of the neural engines 314. Kernel data represents information from which kernel elements can be extracted. In one embodiment, the kernel data may be in a compressed format which is decompressed at each of neural engines 314. Although kernel data provided to each of neural engines 314 may be the same in some instances, the kernel data provided to each of neural engines 314 is different in most instances. In one embodiment, the direct memory access nature of kernel DMA 324 may allow kernel DMA 324 to fetch and write data directly from the source without the involvement of CPU 208.

Data processor circuit 318 manages data traffic and task performance of neural processor circuit 218. Data processor circuit 318 may include a flow control circuit 332 and a buffer 334. Buffer 334 is temporary storage for storing data associated with operations of neural processor circuit 218 and planar engine 340, such as input data that is transmitted from system memory 230 (e.g., data from a machine learning model) and other data that is generated within neural processor circuit 218 or planar engine 340. The data stored in data processor circuit 318 may include different subsets that are sent to various downstream components, such as neural engines 314 and planar engine 340.

In one embodiment, buffer 334 is embodied as a non-transitory memory that can be accessed by neural engines 314 and planar engine 340. Buffer 334 may store input data 322A through 322N for feeding to corresponding neural engines 314A through 314N or planar engine 340, as well as output data 328A through 328N from each of neural engines 314A through 314N or planar engine 340 for feeding back into one or more neural engines 314 or planar engine 340, or sending to a target circuit (e.g., system memory 230). Buffer 334 may also store input data 342 and output data 344 of planar engine 340 and allow the exchange of data between neural engine 314 and planar engine 340. For example, one or more output data 328A through 328N of neural engines 314 are used as the input 342 to planar engine 340. Likewise, the output 344 of planar engine 340 may be used as the input data 322A through 322N of neural engines 314. The inputs of neural engines 314 or planar engine 340 may be any data stored in buffer 334. For example, in various operating cycles, the source datasets from which one of the engines fetches as inputs may be different. The input of an engine may be an output of the same engine in previous cycles, outputs of different engines, or any other suitable source datasets stored in buffer 334. Also, a dataset in buffer 334 may be divided and sent to different engines for different operations in the next operating cycle. Two datasets in buffer 334 may also be joined for the next operation.

Flow control circuit 332 of data processor circuit 318 may control the exchange of data between neural engines 314 and planar engine 340. The operations of data processor circuit 318 and other components of neural processor circuit 218 are coordinated so that the input data and intermediate data stored in data processor circuit 318 may be reused across multiple operations at neural engines 314 and planar engine 340, thereby reducing data transfer to and from system memory 230. Flow control circuit 332 may perform one or more of the following operations: (i) monitor the size and rank of data (e.g. data may be one or more tensors) that are being processed by neural engines 314 and planar engine 340, (ii) determine which subsets of data are transmitted to neural engines 314 or to planar engine 340 based on the task commands associated with different subsets of data, (iii) determine the manner in which data is transmitted to neural engines 314 and planar engine 340 (e.g., the data processor circuit 318 may operate in a broadcast mode where the same data is fed to multiple input channels of neural engines 314 so that multiple or all neural engines 314 receive the same data or in a unicast mode where different neural engines 314 receives different data), and (iv) transmit a configuration command to the planar engine 340 to direct planar engine 340 to program itself for operating in one of multiple operation modes.

The data of neural processor circuit 218 stored in buffer 334 may be part of, among others, image data, histogram of oriented gradients (HOG) data, audio data, metadata, output data 328 of a previous cycle of a neural engine 314, and other processed data received from other components of the SOC component 204.

Data processor DMA 320 includes a read circuit that receives a segment of the input data from a source (e.g., system memory 230) for storing in buffer 334, and a write circuit that forwards data from buffer 334 to a target component (e.g., system memory). In one embodiment, the direct memory access nature of data processor DMA 320 may allow data processor DMA 320 to fetch and write data directly from a source (e.g., system memory 230) without the involvement of CPU 208. Buffer 334 may be a direct memory access buffer that stores data of a machine learning model of device 100 without involvement of CPU 208.

Example Neural Engine Architecture

Figure 4A:
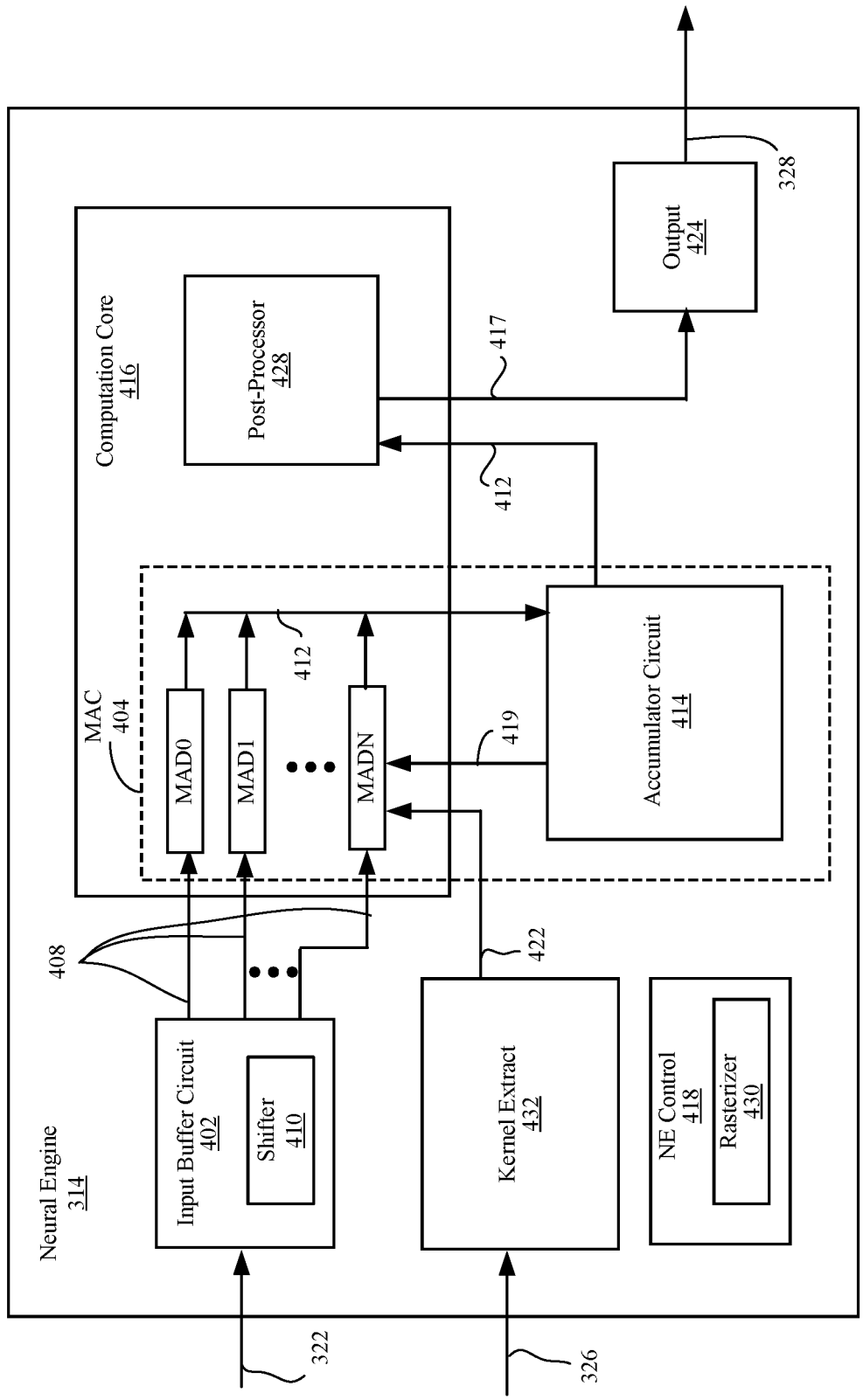
FIG. 4A is a block diagram of a neural engine in the neural processor circuit, according to one embodiment.

FIG. 4A is a block diagram of neural engine 314, according to one embodiment. Neural engine 314 performs various operations to facilitate machine learning such as convolution, tensor product, and other operations may involve heavy computation. For this purpose, neural engine 314 receives input data 322, performs multiply-accumulate operations (e.g., convolution operations) on input data 322 based on stored kernel data, performs further post-processing operations on the result of the multiply-accumulate operations, and generates output data 328. Input data 322 and/or output data 328 of neural engine 314 may be of a single channel or span across multiple channels.

Neural engine 314 may include, among other components, input buffer circuit 402, computation core 416, neural engine (NE) control 418, kernel extract circuit 432, accumulator circuit 414 and output circuit 424. Neural engine 314 may include fewer components than what is illustrated in FIG. 4A or include further components not illustrated in FIG. 4A.

Input buffer circuit 402 is a circuit that stores a subset of the data of neural processor circuit 218 as the subset of data is received from a source. The source may be data processor circuit 318, planar engine 340, or another suitable component. Input buffer circuit 402 sends an appropriate segment 408 of data for a current task or process loop to computation core 416 for processing. Input buffer circuit 402 may include a shifter 410 that shifts read locations of input buffer circuit 402 to change segment 408 of data sent to computation core 416. By changing segments of input data provided to computation core 416 via shifting, neural engine 314 can perform multiply-accumulate for different segments of input data based on a fewer number of read operations. In one or more embodiments, the data of neural processor circuit 218 includes data of difference convolution groups and/or input channels.

Kernel extract circuit 432 is a circuit that receives kernel data 326 from kernel DMA 324 and extracts kernel coefficients 422. In one embodiment, kernel extract circuit 432 references a lookup table (LUT) and uses a mask to reconstruct a kernel from compressed kernel data 326 based on the LUT. The mask indicates locations in the reconstructed kernel to be padded with zero and remaining locations to be filled with numbers. Kernel coefficients 422 of the reconstructed kernel are sent to computation core 416 to populate register in multiply-add (MAD) circuits of computation core 416. In other embodiments, kernel extract circuit 432 receives kernel data in an uncompressed format and the kernel coefficients are determined without referencing a LUT or using a mask.

Computation core 416 is a programmable circuit that performs computation operations. For this purpose, computation core 416 may include MAD circuits MAD0 through MADN and a post-processor 428. Each of MAD circuits MAD0 through MADN may store an input value in the segment 408 of the input data and a corresponding kernel coefficient in kernel coefficients 422. The input value and the corresponding kernel coefficient are multiplied in each of MAD circuits to generate a processed value 412.

Accumulator circuit 414 is a memory circuit that includes multiple accumulators that receive and store processed values 412 from MAD circuits. In one or more embodiments, the accumulator circuit 414 includes multiple sets of accumulators, and each set of accumulators is coupled to a different MAD circuit MAD0 though MADN. In an embodiment, each set of accumulators in the accumulator circuit 414 includes the same number of accumulators, e.g., a number of accumulators in the set is equal to a number of output channels of processed values 412. Alternatively, the sets of accumulators in the accumulator circuit 414 may include different numbers of accumulators. The processed values stored in accumulator circuit 414 may be sent back as feedback information 419 for further multiply and add operations at MAD circuits or sent to post-processor 428 for post-processing. Accumulator circuit 414 in combination with MAD circuits form a multiply-accumulator (MAC) 404. In one or more embodiments, accumulator circuit 414 may have subunits (or batches) where each subunit sends data to different components of neural engine 314. For example, during a processing cycle, data stored in a first subunit of accumulator circuit 414 is sent to the MAC circuit while data stored in a second subunit of accumulator circuit 414 is sent to post-processor 428.

Post-processor 428 is a circuit that performs further processing of values 412 received from accumulator circuit 414. Post-processor 428 may perform operations including, but not limited to, applying linear functions (e.g., Rectified Linear Unit (ReLU)), normalized cross-correlation (NCC), merging the results of performing neural operations on 8-bit data into 16-bit data, and local response normalization (LRN). The result of such operations is output from post-processor 428 as processed values 417 to output circuit 424.

In some embodiments, the processing at the post-processor 428 is bypassed. For example, the data in accumulator circuit 414 may be sent directly to output circuit 424 for access by other components of neural processor circuit 218.

NE control 418 controls operations of other components of neural engine 314 based on the operation modes and parameters of neural processor circuit 218. Depending on different modes of operation (e.g., group convolution mode or non-group convolution mode) or parameters (e.g., the number of input channels and the number of output channels), neural engine 314 may operate on different input data in different sequences, return different values from accumulator circuit 414 to MAD circuits, and perform different types of post-processing operations at post-processor 428. To configure components of neural engine 314 to operate in a desired manner, the NE control 418 sends task commands that may be included in information 419 to components of neural engine 314. NE control 418 may include a rasterizer 430 that tracks the current task or process loop being processed at neural engine 314, as described below in detail with reference to FIG. 6.

Input data is typically split into smaller pieces of data for parallel processing at multiple neural engines 314 or neural engines 314 and planar engine 340. A set of data used for a convolution operation may be referred to as a convolution group, which can be split into multiple smaller units. The hierarchy of smaller units (segments) may be convolution groups, slices, tiles, work units, output channel groups, input channels (Cin), sub-Cins for input stride, etc. For example, a convolution group may be split into several slices; a slice may be split into several tiles; a tile may be split into several work units; and so forth. In the context of neural engine 314, a work unit may be a segment of the input data, such as data processed by planar engine 340 or data processed a prior cycle of neural engines 314 having a size that produces output values that fit into accumulator 414 of neural engine 314 during a single cycle of the computation core 416. In one case, the size of each work unit is 256 bytes. In such embodiments, for example, work units can be shaped to one of 16×16, 32×8, 64×4, 128×2 or 256×1 datasets. In the context of planar engine 340, a work unit may be (i) a segment of input data, (ii) data from neural engine 314 or (iii) data from a prior cycle of planar engine 340 that can be processed simultaneously at planar engine 340.

Rasterizer 430 may perform the operations associated with dividing the input data into smaller units (segments) and regulate the processing of the smaller units through the MACs 404 and accumulator 414. Rasterizer 430 keeps track of sizes and ranks of segments of the input/output data (e.g., groups, work units, input channels, output channels) and instructs the components of a neural processor circuit 218 for proper handling of the segments of the input data. For example, rasterizer 430 operates shifters 410 in input buffer circuits 402 to forward correct segments 408 of input data to MAC 404 and send the finished output data 328 to data buffer 334. Other components of neural processor circuit 218 (e.g., kernel DMA 324, buffer DMA 320, buffer 334, planar engine 340) may also have their corresponding rasterizers to monitor the division of input data and the parallel computation of various segments of input data in different components.

Output circuit 424 receives processed values 417 from post-processor 428 and interfaces with data processor circuit 318 to store processed values 417 in data processor circuit 318. For this purpose, output circuit 424 may send out as output data 328 in a sequence or a format that is different from the sequence or format in which the processed values 417 are processed in post-processor 428.

The components in neural engine 314 may be configured during a configuration period by NE control 418 and neural task manager 310. For this purpose, neural task manager 310 sends configuration information to neural engine 314 during the configuration period. The configurable parameters and modes may include, but are not limited to, mapping between input data elements and kernel elements, the number of input channels, the number of output channels, performing of output strides, and enabling/selection of post-processing operations at post-processor 428.

Three Dimensional Convolution Operation at Neural Engine

Figure 4B:
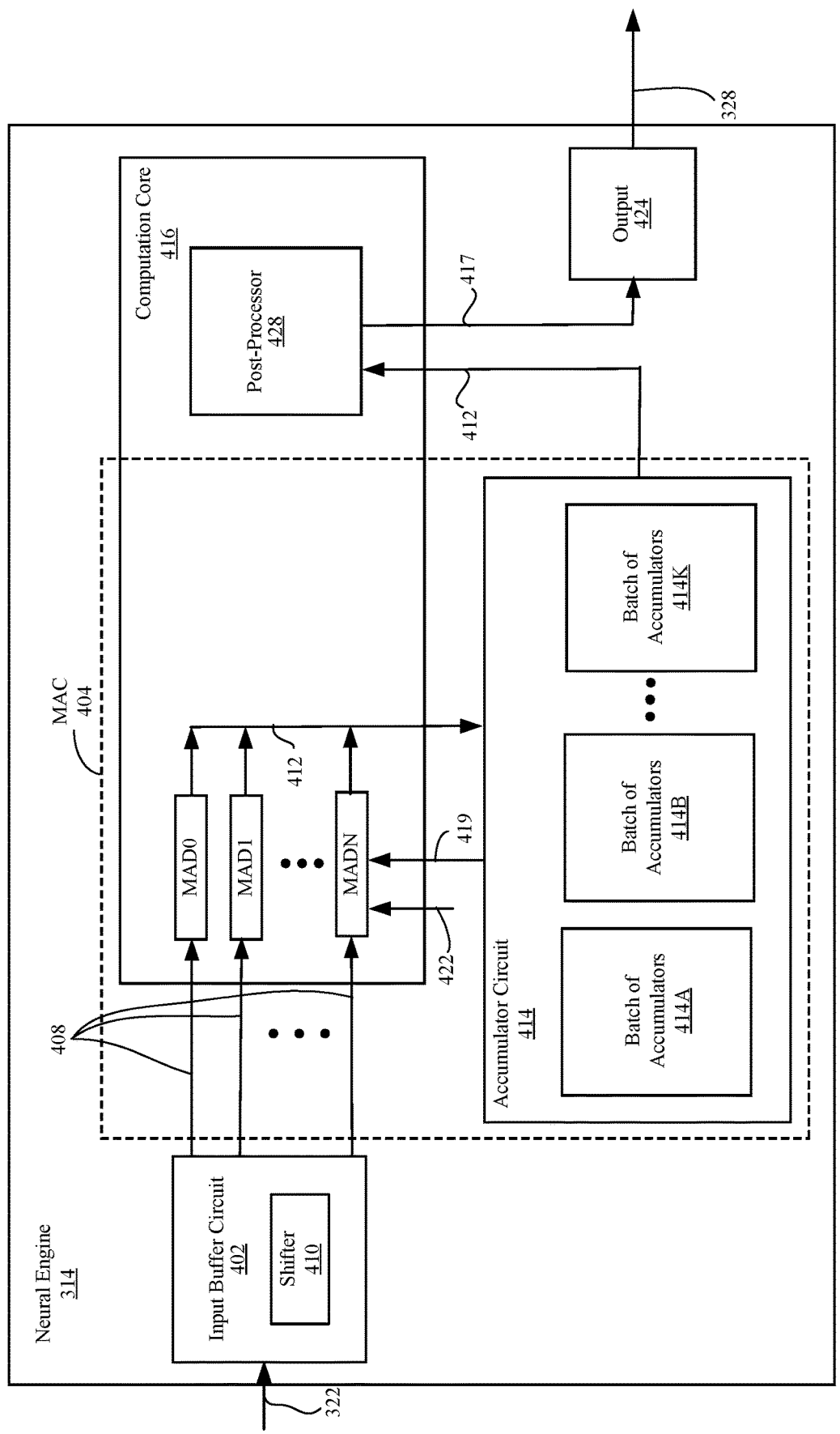
FIG. 4B is a block diagram of the neural engine of FIG. 4A with an accumulator circuit divided into multiple batches of accumulators, according to one embodiment.

FIG. 4B is a block diagram of neural engine 314 with accumulator circuit 414 divided into multiple batches of accumulators, according to one embodiment. MAD circuits MAD0 through MADN of MAC 404 perform multiply-add operations of a three dimensional (3D) convolution on a work unit of input data 408 using kernel coefficients 422 to generate processed values 412 for at least a subset of output channels in each processing cycle of computation core 416. The 3D convolution can be used in processing of volumetric data (e.g., input data 408 having a width dimension, height dimension and depth dimension) or temporal video data (e.g., input data 408 having a width dimension, height dimension and time dimension). Compared to the two dimensional (2D) convolution, operations of the 3D convolution involve an additional dimension referred to herein as a depth dimension. All operations of the 2D convolution, including but not limited to strided convolution, transposed convolution, convolution using sparse and palletized kernels can be applied to the depth dimension of operations of the 3D convolution.

Input data 408 stored in input buffer circuit 402 includes multiple input depth planes, Din, each depth plane having an input width, Win, and an input height, Hin, for each input channel of multiple input channels, Cin. Hence, the spatial support of input data 408 is Win×Hin×Din×Cin. Kernel coefficients 422 from kernel extract circuit 432 can be represented as multiple kernel depth planes, Kd, each kernel depth plane having a kernel width, Kw, and a kernel height, Kh. Hence, the spatial support of kernel coefficients 422 (or kernel) is Kw×Kh×Kd. The spatial support of processed values 412 (or output values) and output data 328 is Wout× Hout×Dout×Cout, where Dout is a number of output depth planes, each output depth plane having a width of Wout and a height of Hout, and Cout is a number of output channels.

MAD circuits MAD0 through MADN perform multiply-add operations on a work unit of input data 408 using kernel coefficients 422 as part of the 3D convolution to generate processed values 412 during the processing cycle of computation core 416. Processed values 412 include multiple output depth planes (e.g., Dout depth planes), each depth plane having the output width, Wout, and the output height, Hout, for each output channel of a subset of the Cout output channels. At the end of the processing cycle, processed values 412 are passed for storage and accumulation into corresponding batches of accumulators in accumulator circuit 414. Accumulated processed values 412 are fed back into MAD circuits MAD0 through MADN as feedback information 419 for multiply-add operations during a next processing cycle of computation core 416 as part of the 3D convolution.

Accumulator circuit 414 is coupled to MAD circuits MAD0 through MADN. In one or more embodiments, accumulator circuit 414 includes N+1 sets of accumulators, and each set of accumulators in accumulator circuit 414 is coupled to a corresponding MAD circuit MAD0 through MADN. Each set of accumulators in accumulator circuit 414 may include Cout accumulators. Accumulator circuit 414 with N+1 sets of Cout accumulators is divided into multiple batches of accumulators, i.e., batches 414A, 414B through 414K for storing corresponding output channels of processed values 412.

Accumulator circuit 414 receives and stores, in a corresponding batch of accumulators 414A, 414B through 414K after the processing cycle, processed values 412 for each output depth plane and for a subset of the output channels Cout. A number of batches of accumulators 414A, 414B through 414K may be equal to the number of kernel depth planes, Kd. Alternatively, the number of batches of accumulators 414A, 414B through 414K is greater than the number of kernel depth planes, Kd. Each batch of accumulators 414A, 414B through 414K may include the same number of accumulators. Alternatively, different batches may include different number of accumulators.

In one or more embodiments, accumulator circuit 414 includes N+1 sets of accumulators, each set of accumulators coupled to a corresponding MAD circuit MAD0 through MADN and includes Cout=8 accumulators for receiving and storing (e.g., over multiple processing cycles) eight output channels of processed values 412. In an embodiment, the spatial support for kernel coefficients 422 include two kernel depth planes, e.g., Kd=2. In such case, accumulator circuit 414 is divided into two batches, e.g., batches 414A and 414B, each batch having N+1 sets of four accumulators as each of the original N+1 sets of eight accumulators is divided into two groups (Kd=2) of four accumulators. During a processing cycle of computation core 416, MAC 404 performs the 3D convolution operation on a work unit of input data 408 using kernel coefficients 422 to generate processed values 412 for four output channels, e.g., output channels 1 through Cout/2 (e.g., when Cout=8). The first batch of accumulators 414A stores processed values 412 for four output channels 1 through Cout/2 and a first depth plane, and the second batch of accumulators 414B stores processed values 412 for the same four output channels 1 through Cout/2 and a second depth plane. During a second processing cycle of computation core 416, MAC 404 performs 3D convolution operation on another work unit of input data 408 using kernel coefficients 422 to generate processed values 412 for remaining four output channels, e.g., output channels Cout/2+1 through Cout. The first batch of accumulators 414A stores processed values 412 for the four remaining output channels, Cout/2+1 through Cout, and the first depth plane. The second batch of accumulators 414B stores processed values 412 for the same four remaining output channels, Cout/2+1 through Cout, and the second depth plane.

In another embodiment, the spatial support for kernel coefficients 422 include four kernel depth planes, e.g., Kd=4. In such case, accumulator circuit 414 is divided into four batches, e.g., batches 414A, 414B, 414C, 414D, each batch having N+1 sets of two accumulators as each of the original N+1 sets of eight accumulators is divided into four groups (Kd=4) of two accumulators. During a processing cycle of computation core 416, MAC 404 performs the 3D convolution operation on a first work unit of input data 408 using kernel coefficients 422 to generate processed values 412 for two output channels, e.g., output channels 1 through Cout/4 (e.g., when Cout=8). The first batch of accumulators 414A stores processed values 412 for two output channels 1 through Cout/4 and a first depth plane. The second batch of accumulators 414B stores processed values 412 for the same two output channels 1 through Cout/4 and a second depth plane. The third batch of accumulators 414C stores processed values 412 for the same two output channels 1 through Cout/4 and a third depth plane. The fourth batch of accumulators 414D stores processed values 412 for the same two output channels 1 through Cout/4 and a fourth depth plane. During a second processing cycle of computation core 416, MAC 404 performs 3D convolution operation on a second work unit of input data 408 using kernel coefficients 422 to generate processed values 412 for next two output channels, e.g., output channels Cout/4+1 through Cout/2. The first, second, third and fourth batch of accumulators 414A, 414B, 414C, 414D stores processed values 412 for the two output channels, Cout/4+1 through Cout/2, and the respective first, second, third and fourth depth plane. During a third processing cycle of computation core 416, MAC 404 performs 3D convolution operation on a third work unit of input data 408 using kernel coefficients 422 to generate processed values 412 for next two output channels, e.g., output channels Cout/2+1 through 3*Cout/4. The first, second, third and fourth batch of accumulators 414A, 414B, 414C, 414D stores processed values 412 for the two output channels, Cout/2+1 through 3*Cout/4, and the respective first, second, third and fourth depth plane. During a fourth processing cycle of computation core 416, MAC 404 performs 3D convolution operation on a fourth work unit of input data 408 using kernel coefficients 422 to generate processed values 412 for remaining two output channels, e.g., output channels 3*Cout/4+1 through Cout. The first, second, third and fourth batch of accumulators 414A, 414B, 414C, 414D stores processed values 412 for the two output channels, 3*Cout/4+1 through Cout, and the respective first, second, third and fourth depth plane.

Input buffer circuit 402 receives, e.g., from data processor circuit 318 during a clock cycle of data processor circuit 318, a depth slice of input data 322 (i.e., all input depth planes z=0, 1, . . . , Din−1) for each input channel. Data processor circuit 318 receives and stores tiles of input data 322 from system memory 230. Input buffer circuit 402 passes, in each processing cycle of the computation core 416, a different portion of the depth slice of input data 322 as a corresponding work unit of input data 408 onto MAC 404. MAD circuits MAD0 through MADN of MAC 404 performs multiply-accumulate operations on the corresponding work unit of input data 408 and kernel coefficients 422 with partial accumulations as part of the 3D convolution operation to generate partial output sums 412 stored in the batches of accumulators 414A through 414K and fed back as feedback information 419 to MAD circuits MAD0 through MADN to generate final processed values 412 stored in the batches of accumulators 414A through 414K. Partial output sums 412 stored in batches of accumulators 414A through 414K during the processing cycle of computation core 416 are associated with all output depth planes Dout and at least a portion of output channels.

Post-processor 428 scales processed values 412 for each output depth plane by a predetermined scale factor to generate processed values 417. A unique scale factor may be predetermined for each output depth plane. Alternatively, the scale factor may be common for two or more depth planes. Output circuit 424 receives processed values 417 from the post-processor 428 and interfaces with data processor circuit 318 to store processed values 417 in data processor circuit 318. For this purpose, output circuit 424 may send out output data 328 in a sequence or a format that is different from the sequence or format in which the processed values 417 are processed in post-processor 428. The spatial support for output data 328 can be the same as for processed values 412, i.e., Wout×Hout×Dout×Cout.

Example Planar Engine

Figure 5:
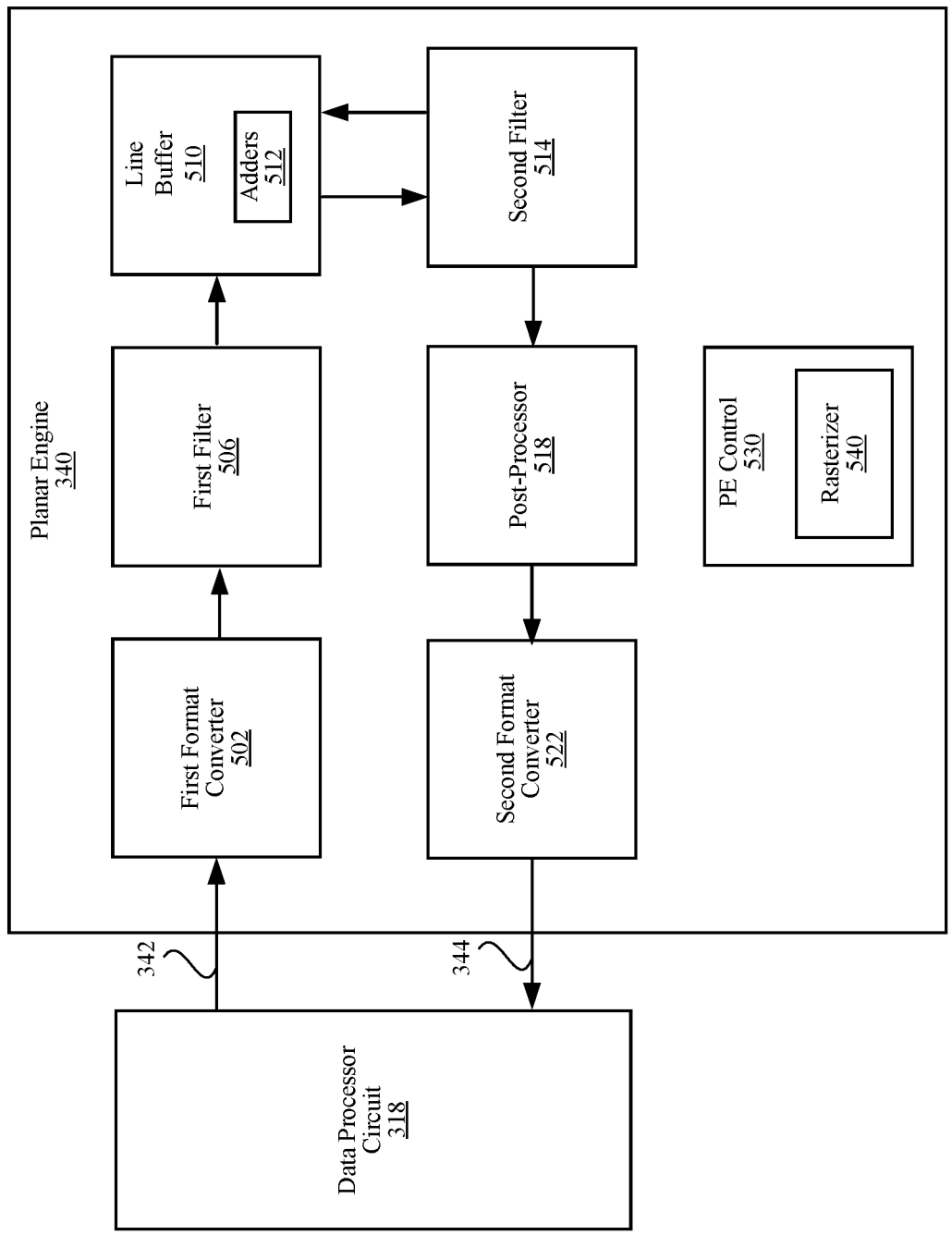
FIG. 5 is a block diagram of a planar engine in the neural processor circuit, according to one embodiment.

FIG. 5 is a block diagram of planar engine 340, according to one embodiment. Planar engine 340 is a circuit that is separated from the plurality of neural engines 314 and can be programmed to perform in different modes of operations. For example, planar engine 340 may operate in a pooling mode that reduces the spatial size of data, in a reduction mode that reduces the rank of a tensor, in a gain-and-bias mode that provides a single-pass addition of bias and scaling by a scale factor, and in an elementwise mode that includes elementwise operations. For this purpose, planar engine 340 may include, among other components, a first format converter 502, a first filter 506 (also referred to herein as "multi-mode horizontal filter 506"), a line buffer 510, a second filter 514 (also referred to herein as "multi-mode vertical filter 514"), a post-processor 518, a second format converter 522, and a planar engine (PE) control 530 (includes rasterizer 540). Planar engine 340 may include fewer components or further components not illustrated in FIG. 5. Each component in planar engine 340 may be embodied as a circuit or a circuit in combination with firmware or software.

Input data 342 of planar engine 340 may be fetched from one or more source datasets that are saved in data processor circuit 318. If a dataset to be processed by planar engine 340 is larger than a work unit of data that can be simultaneously processed by planar engine 340, such dataset may be segmented into multiple work units for reading as input data 342 to planar engine 340. Depending on the mode of planar engine 340, input data 342 may include data from one or more source datasets. The source dataset described herein refers to different data saved in neural processor circuit 218 for processing. Different components of neural processor circuit 218 may generate or transmit data that is saved in data processor circuit 318. For example, neural engines 314, planar engine 340 (which generated data in a previous operation cycle), and system memory 230 may generate or transmit different datasets that are saved in different memory locations of data processor circuit 318. Various source datasets may represent different tensors. In an operation cycle of planar engine 340, different source datasets may be fetched together as input data 342. For example, in an elementwise mode that involves the addition of two different tensors to derive a resultant tensor, the input data 342 may include data from two different source datasets, each providing a separate tensor. In other modes, a single source dataset may provide input data 342. For example, in a pooling mode, input data 342 may be fetched from a single source dataset.

First format converter 502 is a circuit that performs one or more format conversions on input data 342 in one format (e.g., a format used for storing in buffer 334) to another format for processing in subsequent components of planar engine 340. Such format conversions may include, among others, the following: applying a ReLU function to one or more values of input data 342, converting one or more values of input data 342 to their absolute values, transposing a tensor included in the sources, applying gain to one or more values of input data 342, biasing one or more values of input data 342, normalizing or de-normalizing one or more values of input data 342, converting floating-point numbers to signed or unsigned numbers (or vice versa), quantizing numbers, and changing the size of a tensor such as by broadcasting a value of a tensor in one or more dimensions to expand the rank of the tensor. The converted input data 342 and unconverted input data 342 to planar engine 340 are collectively referred to herein as "a version of the input data."

First filter 506 is a circuit that performs a filtering operation in one direction. For this purpose, first filter 506 may include, among other components, adders, comparators, and multipliers. The filtering performed by first filter 506 may be, for example, averaging, choosing a maximum value or choosing a minimum value. When averaging, adders are used to sum the values of input data 342 and a weighting factor may be applied to the sum using a multiplier to obtain the average as the resultant values. When selecting maximum and minimum values, the comparators may be used in place of the adders and the multipliers to select the values.

Line buffer 510 is a memory circuit for storing the result such as one or more intermediate data obtained from first filter 506 or second filter 514. Line buffer 510 may store values of different lines and allows access from second filter 514 or other downstream components to fetch the intermediate data for further processing. In some modes, line buffer 510 is bypassed. Line buffer 510 may also include logic circuits to perform additional operations other than merely storing the intermediate data. For example, line buffer 510 includes adder circuits 512, which in combination with memory component, enables line buffer 510 to function as an accumulator that aggregates data generated from the results of first filter 506 or second filter 514 to separately store aggregated data of a dimension not to be reduced.

Similar to first filter 506, second filter 514 performs filtering operations but in a direction different from first filter 506. For this purpose, second filter 514 may include, among other components, adders, comparators, and multipliers. In the pooling mode, first filter 506 performs filtering operation in a first dimension, while second filter 514 performs filtering operation in a second dimension. In other modes, first filter 506 and second filter 514 may operate differently. In a reduction mode, for example, first filter 506 performs elementwise operations while second filter 514 functions as a reduction tree to aggregate values of data.

Post-processor 518 is a circuit that performs further processing of values fetched from other upstream components. Post-processor 518 may include specialized circuits that are efficient at performing certain types of mathematical computations that might be inefficient to perform using a general computation circuit. Operations performed by post-processor 518 may include, among others, performing square root operations and inverse of values in a reduction mode. Post-processor 518 may be bypassed in other operation modes.

Second format converter 522 is a circuit that converts the results of preceding components in planar engine 340 from one format to another format for output data 344. Such format conversions may include, among others, the following: applying a ReLU function to the results, transposing a resultant tensor, normalizing or de-normalizing one or more values of the results, and other number format conversions. Output data 344 may be stored in data processor circuit 318 as the output of neural processor circuit 218 or as inputs to other components of neural processor circuit 218 (e.g., neural engine 314).

PE control 530 is a circuit that controls operations of other components in planar engine 340 based on the operation mode of planar engine 340. Depending on the different modes of operation, PE control 530 programs register associated with the different components in planar engine 340 so that the programmed components operate in a certain manner. The pipeline of components or connections between the components in planar engine 340 may also be reconfigured. In the pooling mode, for example, data processed at by first filter 506 may be stored in line buffer 510 and then be read by second filter 514 for further filtering. In the reduction mode, however, data is processed by first filter 506, then processed at second filter 514 and then accumulated in line buffer 510 that is programmed as an accumulator. In the elementwise mode, line buffer 510 may be bypassed.

PE control 530 also includes a rasterizer 540 that tracks the current task or process loop being processed at planar engine 340. Rasterizer 540 is a circuit that tracks units or segments of input data and/or loops for processing the input data in planar engine 340. Rasterizer 540 may control the fetch of segments to planar engine 340 in each operation cycle and may monitor the size and rank of each segment being processed by planar engine 340. For example, smaller segments of a dataset may be fetched as input data 342 in a raster order for processing at planar engine 340 until all segments of the source dataset are processed. In fetching the segments, rasterizer 540 monitors the coordinate of the segment in the dataset. The manner in which a dataset is segmented into input data 342 for processing at planar engine 340 may be different compared to how a dataset is segmented into input data 328 for processing at neural engines 314.

The dataset for processing at planar engine 340 may be larger than the capacity of planar engine 340 that can be processed in a single operation cycle. In such case, planar engine 340 fetches different segments of the dataset as input data 342 in multiple operating cycles. The fetched segment may partly overlap with a previously fetched segment and/or a next segment to be fetched. In one embodiment, the portion of overlapping data is fetched only once and reused to reduce the time and power consumption cost of planar engine 340 in fetching data.

Operation of Segmenting of Data for Processing at Neural Processor Circuit

Figure 6:
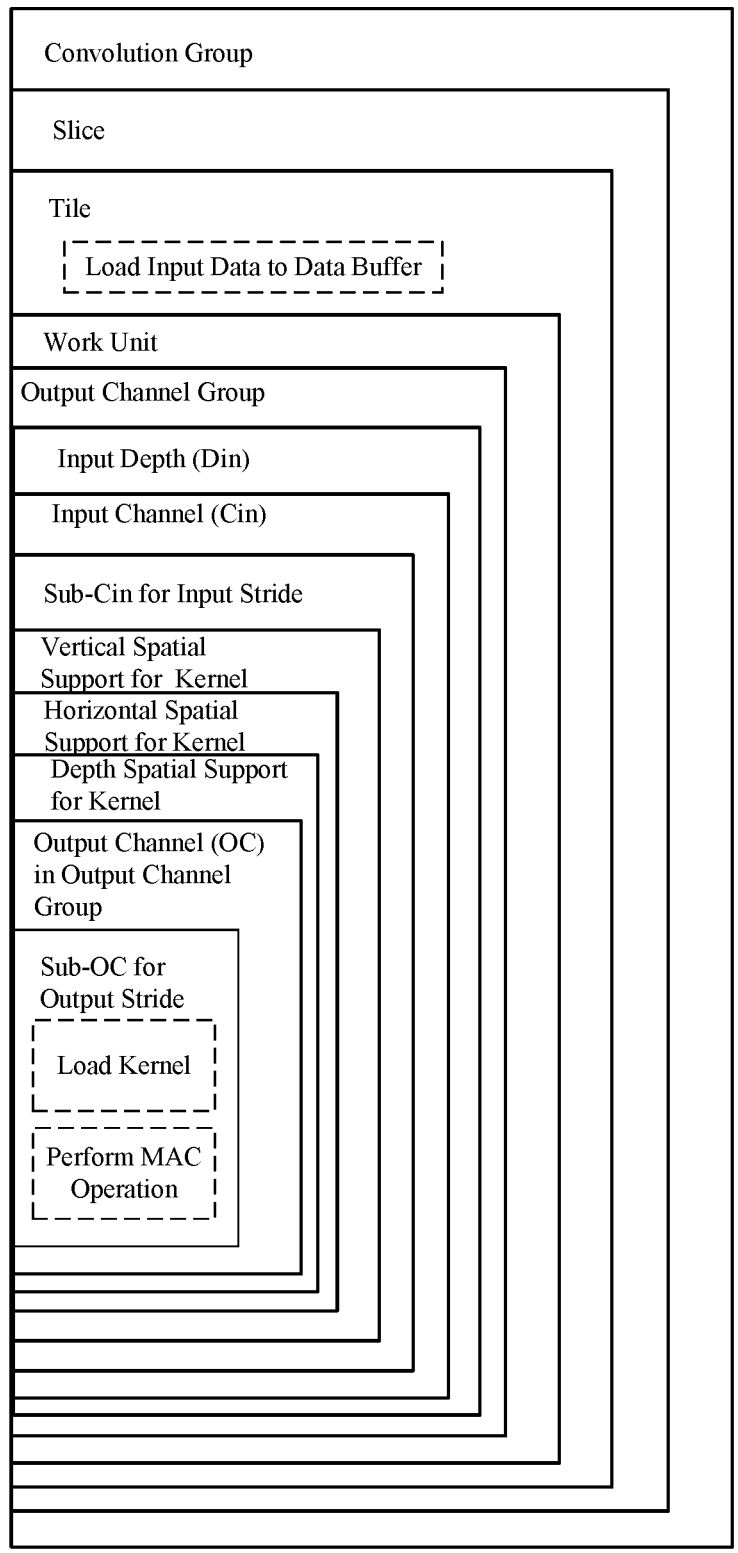
FIG. 6 is a conceptual diagram illustrating loops for processing input data at the neural processor circuit, according to one embodiment.

FIG. 6 is a conceptual diagram illustrating loops for processing the input data at neural processor circuit 218, according to one embodiment. The outermost loop represents processing for a convolution group, if group convolution involving multiple convolution group is used. Group convolutions are convolutions where input data of the input channels in each group are used only for generating output data of output channels of each group but are not used for generating output data for output channels of other groups. Hence, each group of the group convolution can be treated as a separate convolution operation.

In the loop for each convolution group is a processing loop for a slice of the input data. The entire input data for a convolution operation (e.g., 3D convolution operation) is segmented into multiple strips of slices in an overlapping manner. Overlapping portions are parts of the input data that are overfetched in two adjacent slices to provide spatial support for a corresponding kernel. The second outermost loop performs convolution operation (e.g., 3D convolution operation) for each slice in the input data. Within the loop for a slice is a processing loop for a tile of the slice. Each tile is segmented into a plurality of work units. The overlapping portions are parts of the input data in a slice that are overfetched in two adjacent tiles to provide spatial support for a corresponding kernel. The rightmost tile will typically have a width smaller than other tiles of the slice. In one embodiment, input data for each tile is loaded onto data buffer 318 in a read cycle and reused for operations in processing loops for the tile. In the processing loop for the tile is a processing loop for a work unit. Each tile is segmented into multiple work units. A work unit is a portion of the input data having a size that produces output values that fit into accumulator circuit 414 of neural engine 314 during a single cycle of the computation core 416. The shape of each work unit can be a horizontal strip. However, the shape of the work unit can be different depending on the shape and size of the tile. The work units also have overlapping parts that represent overfetched to provide support for a corresponding kernel. Especially, work units for the last tile of a slice may have a shape of a vertical strip if the tile is tall. In one or more embodiments, as discussed, the size of each work unit is 256 bytes. In such embodiments, for example, work units can be shaped to one of 16×16, 32×8, 64×4, 128×2 or 256×1 dimension.

For each work unit, an internal processing loop may be provided for an output channel group (OCG). The number of output channels produced for a given work unit by a single cycle of the computation core 416 is referred to as an OCG. Depending on operation modes, each neural engine 314 may process output data of different numbers of output channels (e.g., 8 channels, 32 channels) for a single load of input data into its input buffer circuit 402.

For each output channel group, an internal processing loop may be provided for an input depth (Din). For each input depth plane, an internal processing loop may be provided for an input channel (Cin). If an input stride is implemented to skip certain input data, loops for sub-input channels (Sub-Cin) may be provided within the processing loop for the input channel (Cin).

For each input channel or each sub-input channel, internal loops are provided for processing vertical spatial support for a kernel, the horizontal spatial support within each vertical spatial support, and the depth spatial support within each horizontal spatial support. The spatial support refers to the input data for 3D convolution with the kernel, and includes overfetched input data for performing 3D convolution at the edges of the input data.

Overfetch refers to fetching additional input data in current slice, tile or work unit so that proper dimension of input data can be provided for 3D convolution with a kernel. In one or more embodiments, overfetch is performed vertically between slices to obtain additional rows of input data, horizontally between tiles to obtain additional columns of input data, and vertically between work units within a tile to obtain additional rows of input data.

For each spatial support for the kernel, an internal processing loop for an output channel (OC) is provided to generate output data for each output channel (Cout). In cases where output stride implements a spatial upsampling, an additional inner loop for processing each sub-output channel is provided. Loading of kernel coefficients and MAC operations are performed within the loop for the output channel (OC) or sub-output channel if an output stride is implemented, to generate output data for the output channel (OC) or sub-output channel.

The nested loop structure of FIG. 6 is merely illustrative. Loops may be omitted, added or structured differently depending on various factors. For example, if only a single convolution group is used, the outermost loop may be removed. Further, the loop structure for the horizontal spatial support, the vertical spatial support and the depth spatial support may be in different order.

Example Process at Neural Engine Architecture

Figure 7:
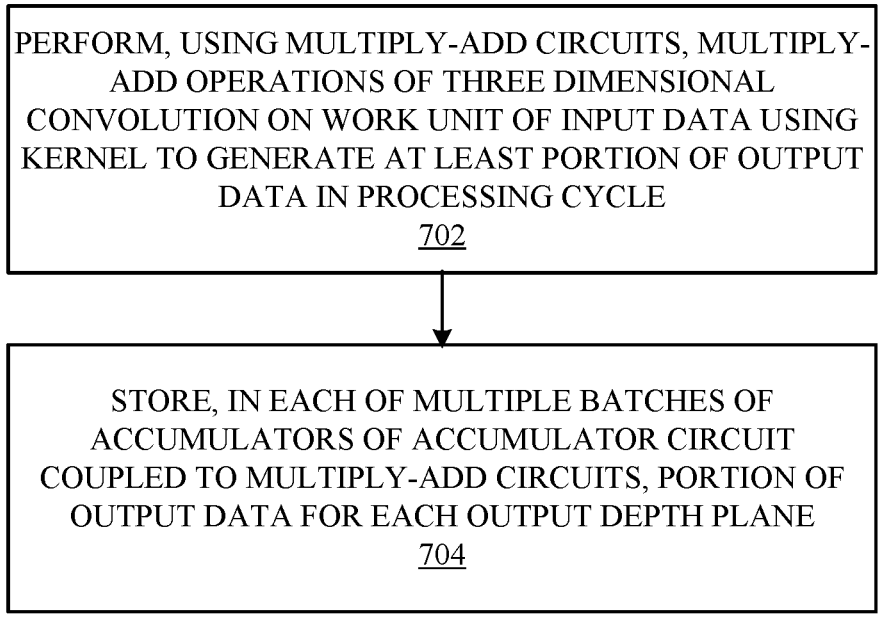
FIG. 7 is a flowchart illustrating a method of performing three dimensional convolution on input data at a neural engine, according to one embodiment.

FIG. 7 is a flowchart illustrating a method of performing a three dimensional (3D) convolution operation on input data in neural engine 314, according to one embodiment.

Neural engine 314 performs 702 (e.g., using the MAD circuits MAD0 through MADN of MAC 404) multiply-add operations of the 3D convolution operation on a work unit of input data (e.g., input data 408) using a kernel (e.g., kernel coefficients 422) to generate at least a portion of output data (e.g., processed values 412) in a processing cycle of neural engine 314.

After the processing cycle, neural engine 314 stores 704 the portion of the output data (e.g., processed values 412) for each output depth plane of multiple output depth planes in each of multiple batches of accumulators, e.g., in batches of 414A through 414K. The output depth plane comprises the portion of the output data for an output channel having an output width and an output height. Neural engine 314 stores, after the processing cycle, the portion of the output data (e.g., processed values 412) for a subset of output channels and for each output depth plane in the corresponding batch of accumulators.

Embodiments of the process as described above with reference to FIG. 7 are merely illustrative. Moreover, sequence of the process may be modified or omitted.

While particular embodiments and applications have been illustrated and described, it is to be understood that the invention is not limited to the precise construction and components disclosed herein and that various modifications, changes and variations which will be apparent to those skilled in the art may be made in the arrangement, operation and details of the method and apparatus disclosed herein without departing from the spirit and scope of the present disclosure.

What is claimed is:

1. A neural engine circuit comprising:
a plurality of multiply-add circuits configured to perform multiply-add operations of a convolution on input data using a kernel to generate output data comprising a plurality of output depth planes for each of a plurality of output channels, each of the plurality of output depth planes having an output width and an output height; and
an accumulator circuit comprising a plurality of batches of accumulators coupled to the plurality of multiply-add circuits, each batch of the plurality of batches of accumulators configured to store a portion of the output data for two or more of the plurality of output channels and a respective output depth plane of the plurality of output depth planes for each of the two or more of the plurality of output channels.

2. The neural engine circuit of claim 1, wherein each batch of the plurality of batches of accumulators comprises multiple accumulators.

3. The neural engine circuit of claim 1, wherein the respective output depth plane for each of the two or more of the plurality of output channels has the output width and the output height.

4. The neural engine circuit of claim 1, wherein the input data comprises multiple input depth planes having an input width and an input height for each input channel of a plurality of input channels.

5. The neural engine circuit of claim 1, wherein the kernel comprises multiple kernel depth planes having a kernel width and a kernel height.

6. The neural engine circuit of claim 5, wherein a number of the plurality of batches of accumulators is equal to a number of the multiple kernel depth planes.

7. The neural engine circuit of claim 1, wherein the neural engine circuit is configured to:

receive a depth slice of the input data from a data buffer coupled to the neural engine circuit and a system memory external to the neural engine circuit.

8. The neural engine circuit of claim 7, wherein the multiply-add circuits and the accumulators are configured to:

perform multiply-accumulate operations with partial accumulations as part of the convolution on the depth slice of the input data and the kernel to generate partial output sums stored in the plurality of batches of accumulators.

9. The neural engine circuit of claim 8, wherein the partial output sums stored in the plurality of batches of accumulators are associated with the plurality of output depth planes and a portion of the plurality of output channels.

10. The neural engine circuit of claim 1, further comprising:

a post-processor coupled to the accumulator circuit, the post-processor configured to scale the output data for each output depth plane of the plurality of output depth planes by a scale factor predetermined for each of the plurality of output depth planes.

11. A method of operating a neural engine circuit, comprising:

performing, using a plurality of multiply-add circuits, multiply-add operations of a convolution on input data using a kernel to generate output data comprising a plurality of output depth planes for each of a plurality of output channels, each of the output depth planes having an output width and an output height; and storing, in each batch of a plurality of batches of accumulators of an accumulator circuit coupled to the plurality of multiply-add circuits, a portion of the output data for two or more of the plurality of output channels and a respective output depth plane of the plurality of output depth planes for each of the two or more of the plurality of output channels.

12. The method of claim 11, wherein the input data comprises multiple input depth planes having an input width and an input height for each input channel of a plurality of input channels.

13. The method of claim 11, wherein the kernel comprises multiple kernel depth planes having a kernel width and a kernel height.

14. The method of claim 13, wherein a number of the plurality of batches of accumulators is equal to a number of the multiple kernel depth planes.

15. The method of claim 11, further comprising:

receiving a depth slice of the input data from a data buffer coupled to the neural engine circuit and a system memory external to the neural engine circuit.

16. The method of claim 15, further comprising:

performing multiply-accumulate operations with partial accumulations as part of the convolution on the depth slice of the input data and the kernel to generate partial output sums stored in the plurality of batches of accumulators.

17. The method of claim 16, wherein the partial output sums stored in the plurality of batches of accumulators are associated with the plurality of output depth planes and a portion of the plurality of output channels.

18. The method of claim 11, further comprising:

scaling the output data for each output depth plane of the plurality of output depth planes by a scale factor predetermined for each of the plurality of output depth planes.

19. An electronic device comprising:

a system memory;

at least one neural engine circuit including:

a plurality of multiply-add circuits configured to perform multiply-add operations of a convolution on input data using a kernel to generate output data comprising a plurality of output depth planes for each of a plurality of output channels, each of the plurality of output depth planes having an output width and an output height, and an accumulator circuit comprising a plurality of batches of accumulators coupled to the plurality of multiply-add circuits, each batch of the plurality of batches of accumulators configured to store a portion of the output data for two or more of the plurality of output channels and a respective output depth plane of the plurality of output depth planes for each of the two or more of the plurality of output channels;

a data buffer coupled to the system memory and the at least one neural engine circuit, the data buffer configured to:

receive the input data from the system memory, and broadcast the received input data to the at least one neural engine circuit; and a kernel fetcher circuit coupled to the system memory and the at least one neural engine circuit, the kernel fetcher circuit configured to:

fetch the kernel from the system memory, and send the fetched kernel to the at least one neural engine circuit.

20. The electronic device of claim 19, wherein:

each batch of the plurality of batches of accumulators comprises multiple accumulators;

the input data comprise multiple input depth planes having an input width and an input height for each input channel of a plurality of input channels; and the kernel comprises multiple kernel depth planes having a kernel width and a kernel height.

* * * * *

UNITED STATES PATENT AND TRADEMARK OFFICE
CERTIFICATE OF CORRECTION

PATENT NO. : 11,853,868 B2
APPLICATION NO. : 17/944889
DATED : December 26, 2023
INVENTOR(S) : Mills et al.

Page 1 of 1

It is certified that error appears in the above-identified patent and that said Letters Patent is hereby corrected as shown below:

In the Specification

In Column 18, Line 25, delete "328" and insert -- 342 --, therefor.

In Column 18, Line 66, delete "318" and insert -- 334 --, therefor.

In the Claims

In Column 21, Claim 11, Line 30, after "the", insert -- plurality of --.

In Column 22, Claim 20, Line 47, delete "comprise" and insert -- comprises --, therefor.

Signed and Sealed this
Fifth Day of March, 2024

Katherine Kelly Vidal
*Director of the United States Patent and Trademark Office*